United States Patent [19]

Bielik

[11] 3,955,779

[45] May 11, 1976

[54] CARTRIDGE WITH REMOVABLE TAKE-UP SUB-CARTRIDGE

[75] Inventor: Paul G. Bielik, North Riverside, Ill.

[73] Assignee: Bell & Howell Company, Chicago, Ill.

[22] Filed: May 28, 1974

[21] Appl. No.: 473,640

[52] U.S. Cl. .............................. 242/199; 242/56 R; 352/72
[51] Int. Cl.² ................. G03B 1/04; G11B 15/32; G11B 23/04
[58] Field of Search ........... 242/199, 200, 197, 198, 242/195, 210, 188, 187, 190, 71.2, 71.1, 74, 57, 56 R, 58.1, 58.4, 58.5; 352/72, 78 R; 354/211; 95/31

[56] References Cited
UNITED STATES PATENTS

| 2,298,574 | 10/1942 | Lockhart | 354/211 X |
| 2,661,164 | 12/1953 | Badmaieff | 242/188 |
| 2,911,161 | 11/1959 | Proctor | 242/188 |
| 3,499,376 | 3/1970 | Swift | 352/72 X |
| 3,691,921 | 9/1972 | Isbell | 95/31 |
| 3,783,763 | 1/1974 | Whitely et al. | 352/72 X |

FOREIGN PATENTS OR APPLICATIONS

| 563,308 | 8/1944 | United Kingdom | 354/211 |

Primary Examiner—Leonard D. Christian
Attorney, Agent, or Firm—Robert A. Walsh

[57] ABSTRACT

A cartridge primarily for microfilm, or cassette, contains a supply reel and a sub-cartridge take-up means. Suitable guides in the cartridge or cassette automatically thread film from the supply reel past a cutter and into the sub-cartridge. To remove exposed film before the supply reel is exhausted, the cutter is operated, and the sub-cartridge is removed and replaced. The nature of the cutter and threader depends upon costs and convenience. At one extreme, they may be hand operated devices and at the other extreme automatic or a remotely controllable device.

11 Claims, 7 Drawing Figures

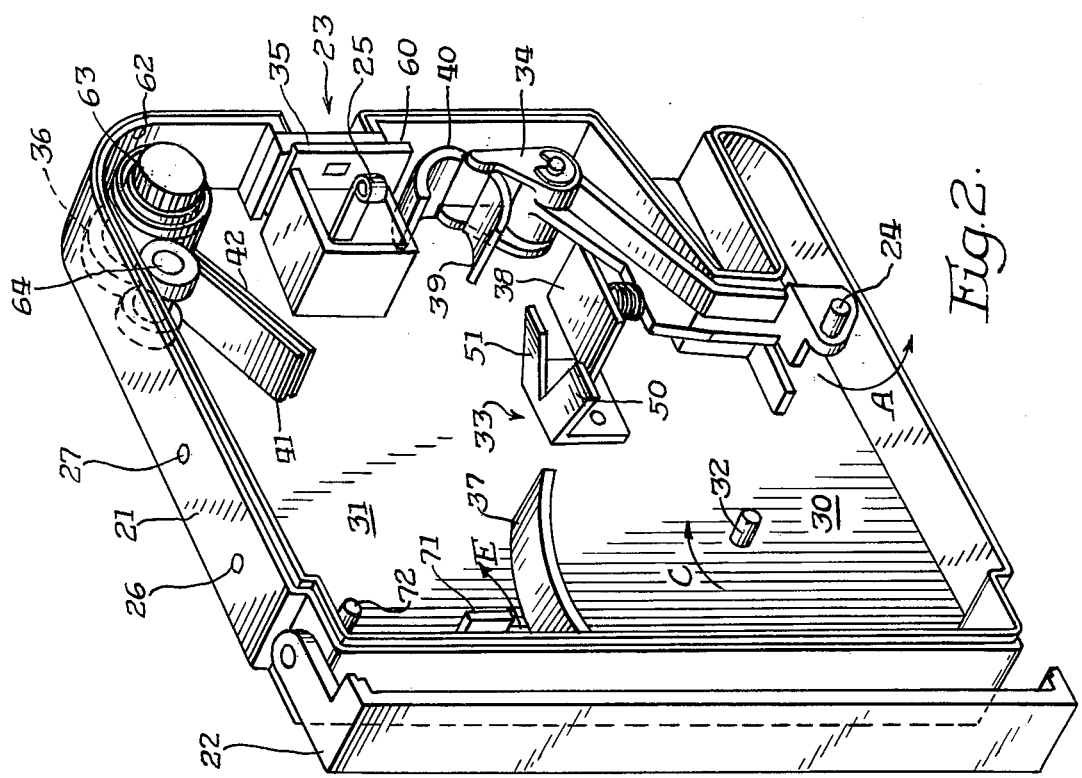
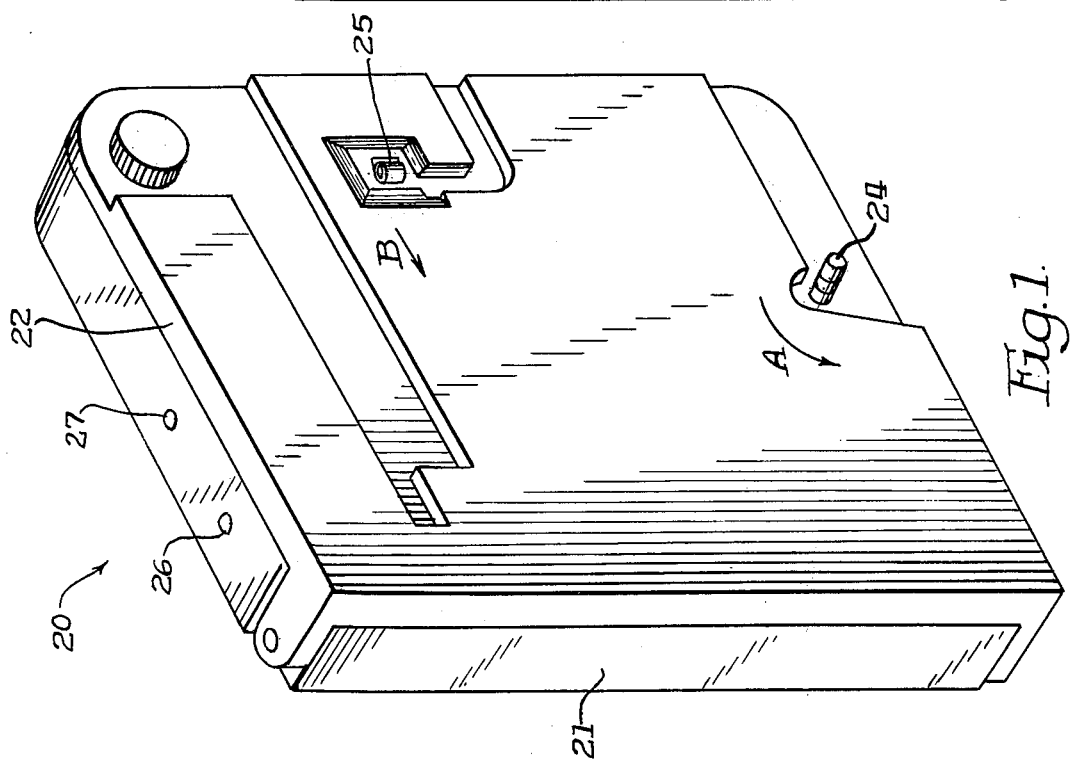

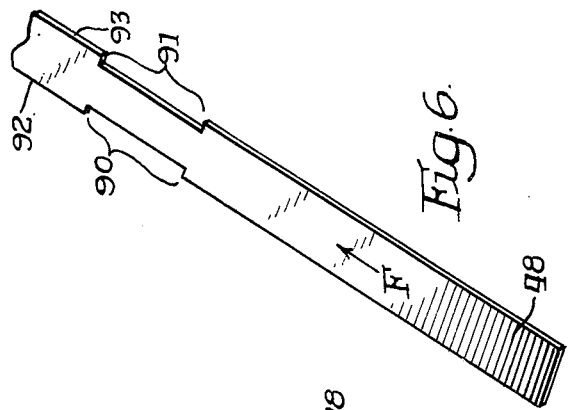
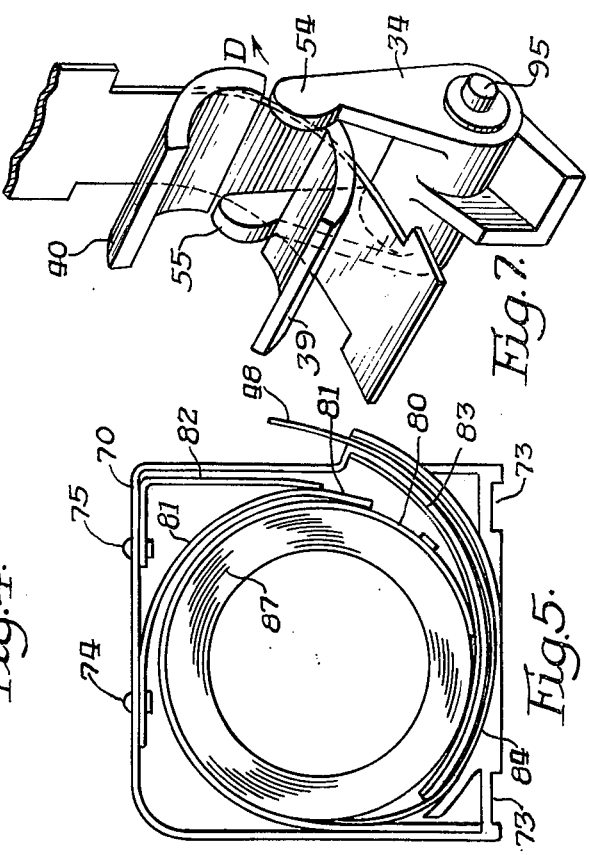
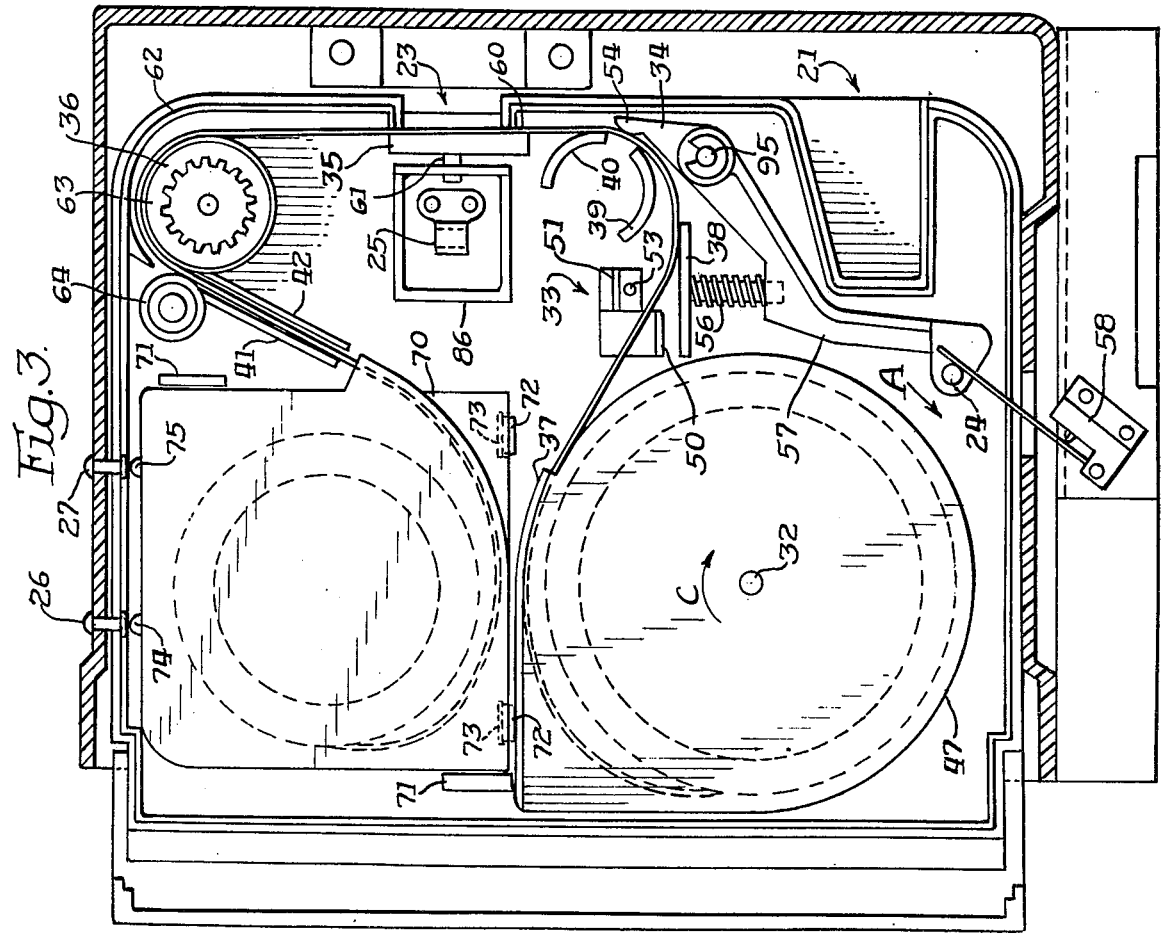

CARTRIDGE WITH REMOVABLE TAKE-UP SUB-CARTRIDGE

This invention relates to cartridges or cassettes and more particularly to such cartridges or cassettes which may be partially unloaded before a supply reel is exhausted.

Some aspects of this invention and of associated equipment are shown and described in a co-pending application entitled "Cartridge or Cassette Control System with an Automatic Final Run at the End of a Web", filed concurrently with this application, having Ser. No. 473,467, filed May 28, 1974, now U.S. Pat. No. 3,920,332 and assigned to the assignee of this invention.

The term "web" is used herein to mean any suitable kind of tape-like device, such as movie film, microfilm, magnetic tape, or the like. Very often this kind of a web is packaged in a removable cartridge, cassette or similar device (herein collectively called "cartridge"). To install or remove the web in an associated machine (such as a camera, projector, or tape player), it is only necessary to insert or remove the cartridge or cassette in a suitable chamber provided in the machine.

One problem which results from the use of such a cartridge relates to the length of a web. Consider a web of unexposed film, by way of example. If it is necessary to expose and develop only a non-standard short length of film, there would be a very high labor cost for loading and unloading a supply roll of film since essentially the same labor is required to load 6 inches, 6 feet, or 60 feet of film. In fact, it is probably more expensive to load a very short non-standard length of film than it is to load a much longer standard length of film. Thus, it might be argued that it would always be less expensive to throw away the unexposed film on the supply reel when a short length must be developed at once than it would be to custom load a cartride or cassette with many different non-standard lengths of film.

Accordingly, it is possible that the least expensive approach is to provide a cartridge with a supply reel which holds a full and standard length of film, and to repeatedly cut off selected lengths of exposed film in order to develop less than a full roll. One way of doing this is to provide a removable take-up sub-cartridge for accepting the shorter lengths of exposed film. However, the threading of film from the standard size supply roll into each new take-up subcartridge is also a labor intensive task, and perhaps even more expensive than custom loading since it would be done by the camera operator, who is not as proficient a factory worker who does nothing but load film.

On the other hand, it would be too expensive to provide an automatic machine for performing all of these tasks. Hence, there is a need for a reasonable compromise wherein hand labor is used in such an efficient manner that it has the advantages of mechanized controls.

The present invention may be used in connection with any of many different kinds of machines. However, it has special utility in connection with low cost microfilm cameras, each as described herein by way of example. Presently, these microfilm cameras are being extensively used by organizations which professionally record photographic images of important and valuable documents. Usually, their microfilming cameras are large, cumbersome, and expensive, often requiring specially trained personnel to operate and maintain them. As a result, many smaller organizations cannot afford the time, expense, or manpower necessary to efficiently provide their own microfilming needs. Therefore, some manufacturers have begun to supply microfilming equipment adapted to use cartridge-packed film. However, many of these cartridges must still be threaded into the camera by hand, with a resulting loss of time and efficiency.

Therefore, an object of the present invention is to provide new and improved cartridges or cassettes with a variable length web available at the output end thereof. Stated another way, an object is to provide means for developing less than a full roll of exposed film.

Another object of the invention is to provide new and improved self-service microfilm systems, and more particularly to provide means for removing short lengths of exposed film without unduly disturbing longer lengths of unexposed film on a supply reel. Here an object is to provide cartridges which contain a full supply of film and a removable sub-cartridge which takes up incremental lengths of exposed film. In particular, an object is to provide a self-threading cartridge which is able to automatically thread film from a supply reel into a removable take-up sub-cartridge with manually controlled threading.

Still another object of the invention is to provide self-threading web supply and take-up means.

Yet another object of the present invention is to provide a self-threading web supply and take-up cartridge which is adapted to receive a replaceable sub-supply cartridge and a replaceable sub-take-up cartridge, thereby permitting the cartridge to be re-used once the supply of web material is spent.

In keeping with an aspect of the invention, these and other objects are accomplished by providing a cartridge having therein a standard full length supply reel with a sub-cartridge take-up means. When it is desirable to remove any length of exposed film, the cutter is operated, and the sub-cartridge is removed and replaced. The film in the sub-cartridge is then removed therefrom and developed. The nature of the means for cutting and feeding the film may vary depending upon acceptable and desired costs, convenience, and the like. At one extreme, the cutter or threader may be hand operated devices and at the other extreme, they could be either automatic or remotely controllable devices.

The nature of a preferred embodiment of the invention may be understood from a study of the attached drawings wherein:

FIG. 1 is a perspective view of a cartridge in a closed condition ready to be inserted into an associated machine, such as a microfilm camera, for example;

FIG. 2 is a perspective view of the same cartridge with a door or cover open to reveal the cutter;

FIG. 3 is a plan view of the inventive cartridge with both the supply reel and the take-up cartridge in place;

FIG. 4 is a plan view of an empty sub-cartridge with its cover removed;

FIG. 5 is a plan view of a full sub-cartridge with its cover removed;

FIG. 6 is a perspective view of a length of web or film with an end-of-web indicating notch formed therein; and FIG. 7 is a perspective view of a subassembly in the cartridge for guiding and for detecting the end of the web notch shown in FIG. 6.

The inventive cartridge 20 (FIGS. 1 and 2) comprises a light tight housing 21 and a cover 22. The housing 21 includes a window or format area 23 for exposing a frame of film contained therein. The cover 22 includes an end of web operator pin 24 and a cover latch 25. Pin 24 swings in direction A at the end of the web to inform an associated machine, such as a microfilm camera or other suitable device, that the web supply is exhausted. The cover latch 25 is a leaf spring having an enlarged end latch held by its own tension in a direction B to latch the cover 22. Two electrical contacts 26, 27 extend electrical circuits from the inside of the cartridge 20 to the associated machine.

When loaded, cartridge 20 of FIG. 1 may be inserted into any suitable machine. In such a machine, it may be desirable to remove a short length of exposed film, at any time, without unduly distrubing the supply of unexposed film. Then, the supply reel may be manipulated to thread the film onto another fresh take-up device, after which still another short length of exposed film may be removed.

The nature of the automatic threading aspect to the cartridge may be understood by reference to FIGS. 2, 3. In greater detail, the housing 21 includes a space 30 for a supply reel and a space 31 for a take-up sub-cartridge or other similar device. The hub of the supply reel is fitted over a stationary post 32. The supply reel may also be furnished in a light tight sub-supply cartridge 47a which is inserted in housing 21 over hub or post 32. The remainder of the components include a cutter 33, an end of web detector 34, a pressure plate 35, a capstan and guide roller 36, and various guide plates and partitions 37–42 in the web threading path.

The nature of the path may be understood from a study and comparison of FIGS. 2 and 3. More particularly, a user of a small microfilm system usually buys a standard length of film packed on a supply reel 47 having solid flanges on either side for preventing ambient light from reaching the unexposed film.

The supply reel 47 in sub-supply cartridge 47a is placed over post 32 with the curl of the film 48 generally conforming to the curvature of a guide plate 37 molded into the sub-cartridge housing 47a. Then, the user feeds the supply reel 47 in direction C to unroll the unexposed film from reel 47 and sub-cartridge housing 47a.

As the unexposed film is being unwound from the supply reel 47, its end passes between scissor blades 50, 51 of cutter 30, and strikes a deflection plate 38 molded into the cartridge housing 21. The scissor blades 50, 51 are simply a short length of flat spring steel bent to an "L" shape so that it may be riveted at 53 or otherwise secured to the housing 21. The cantilever end of the L-shape is split longitudinally, sharpened, and bent to form two open scissor blades. Thus, the film may be cut by placing the thumb under blade 50 and the index finger over blade 51 and squeezing them together.

As the advancing end of the film strikes deflector plate 38, it is deflected upwardly toward a pair of arcuate partition walls 39, 40 which are molded into the housing body 21 with a separation between them. The film 48 passes between wall 39 and tines 54, 55 of an end of film or web detector. The tips of the tines fit into the separation between the partition walls 39, 40. As the film passes, tines 54, 55 are pushed in direction D, out of the separation and against the urging of compression spring 56 extending from plate 38 to arm 34. This swings arm 57, with pin 24, in a direction opposite to direction A and opens a micro-switch 58. Any associated machine (such as a microfilm camera) may be adapted to respond to signals from switch 58, thereby providing an interlock between the availability of the film or web supply and machine operation.

As the film or web 48 continues to advance, it leaves wall 40 and strikes a ledge 60 formed by the bottom edge of pressure plate 35. Plate 35 is pushed against the urging of spring 61 so that the film 48 is held with a plane surface pressed against the format area 23 of the cartridge housing 21.

With this continuing advancement, the end of the film strikes the curved wall and guide plate 62 which deflects it around capstan and guide roller 36. A gear 62 is integrally formed on the end of guide roller 36 (preferably a single molded plastic element) so that the associated machine, such as a microfilm camera, may advance the film by driving the capstan. Roller 64 is a pinch roller acting in cooperation with the capstan and guide roller 36. The film end reaches and passes between the guide plates 41, 42.

An empty take-up sub-cartridge 70 is placed in space 31 and held in position by a suitable bias means comprising at least one locating post and at least one spring. In greater detail, sub-cartridge 70 includes a slot 73 which fits over leaf springs 72 and sub-cartridge is located between posts 71, molded into the cartridge or cassette housing 21. Leaf springs 72 urge the sub-cartridge 70 in direction E. The top of sub-cartridge 70 includes electrical terminals 74, 75 which leaf springs 72 urge against mating terminals 26, 27 in the cartridge 21 with suitable contact pressure.

Sub-cartridge 70 is a closed, light tight box having an entrance slot 78 and three nested convolute springs 80–82. Guide ways 83, 84 are a molded part of the box. When the sub-cartridge 70 is in position inside cartridge 20, the slot 78 is aligned with the ends of guide plates 41. Therefore, the advancing end of the film enters the slot and take-up sub-cartridge. The person feeding film from supply reel 47 observes this entry of the film into sub-cartridge 70 and stops removing film from the reel 47. The cartridge 20 is now loaded. Cover 22 is closed over the housing 21, and spring arm or latch 25 snaps through a hole in the cover 22. A light tight box 86, molded into the housing 21, prevents light from passing through the opening of latch 25 to the film 48.

Each time that a microfilm frame is exposed, gear 63 is incrementally rotated by any suitable means (not shown) to inject an incremental length of film 48 into the sub-cartridge 70. Guides 83, 84 and the convolute spring 80 guide the injected film into a film coil 87 (FIG. 5).

As more film is injected into the take-up sub-cartridge 70, the film coil 87 increases in diameter. Convolute spring 80 gradually expands as the coil 87 diameter increases. Eventually, spring 80 and film coil 87 reach a diameter which is large enough to mechanically close the convolute springs 81, 82, thereby closing an electrical circuit between the terminals 74, 75, and via contacts 26, 27, to the associated machine. This signal may inhibit further operation of the machine until after the filled take-up sub-cartridge (FIG. 5) is removed and replaced by an empty one (FIG. 4).

Regardless of why the operator decides to remove take-up sub-cartridge 70, he operates the machine to drive gear 63 and capstan 36 and thereby insert the exposed film into the sub-cartridge 70. Then, the cover 22 is opened. Scissor blades 50, 51 are squeezed together to cut the film. The full sub-cartridge 70 is removed for processing. An empty sub-cartridge 70 is placed in the cartridge 20. Additional film is fed from supply reel 47 and is rotated in direction C. Then the cover 22 is closed and cartridge 20 is again ready for use.

The above described process of removal and replacement of sub-cartridge may be repeated any suitable number of times. When film supply reel 47 is spent, a new sub-supply-cartridge 47a is inserted in cartridge 21, and film from the new supply sub-cartridge is threaded through cartridge 21 as described above. The exhaustion of unexposed film 48 on reel 47 activates microswitch 58 which signals the end of the reel.

The nature of the end of the film or web 48 is seen in FIG. 6 as including a pair of oppositely disposed notches 90, 91. The microswitch 58 (FIG. 3) is operated by pin 24 which, in turn, is moved when shoes 54, 55 drop through notches 90, 91 in the end of the film or web 48. More particularly, a pair of sleigh shaped shoes 54, 55 ride along the outside edges 92, 93 of the unexposed film 45 as it is advanced in direction F through the cartridge 20. At this time, the thickness and strength of the film 48 hold the shoes 54, 55 in a displaced position, as shown in FIG. 3. The lever assembly 34 pivots on a shaft 95 and the pin 24 is moved in a direction opposite to arrow A so that switch 58 is not operated.

When that portion of film 48 which is notched at 90, 91 reaches the shoes 54, 55, they drop to the position shown in FIG. 7. Lever arm 34 rotates on axis 95 and moves pin 24 in direction A. This movement closes switch 58 and places the associated machine in an end of web mode of operation. For example, its web transport mechanism may go into an automatic final run sequence, whereby a suitable length of film (such as 6 inches) is pulled from supply reel 47 and pushed into the take-up sub-cartridge 70.

Those skilled in the art will readily perceive various modifications falling within the scope of the invention. Therefore, the appended claims are to be construed broadly enough to cover all equivalent structures.

I claim:

1. A main cartridge for a web, said main cartridge comprising a supply reel, removable sub-cartridge take-up means, and guide means in said main cartridge for automatically threading said web from a path extending from said supply reel and into said sub-cartridge, means for inserting said web into said sub-cartridge, and corresponding electrical contacts in each of said main and sub-cartridges, and means for biasing said sub-cartridge into contact with said main cartridge with sufficient pressure to make good contact between said electrical contacts in said cartridge and said electrical contacts in said sub-cartridge.

2. A main cartridge for a web, said main cartridge comprising a supply reel, removable sub-cartridge take-up means, and guide means in said main cartridge for automatically threading said web from a path extending from said supply reel and into said sub-cartridge, means for inserting said web into said sub-cartridge, cutter means in said web path between said supply reel and said sub-cartridge take-up means, said cutter means comprising a normally open pair of scissor blades with one blade on each side of said path.

3. The cartridge of claim 1 wherein said bias means comprises a post in said main cartridge for locating said sub-cartridge and a spring for urging said sub-cartridge into contact with said post.

4. The cartridge of claim 3 and a normally open plurality of nested convolute springs in said sub-cartridge for coiling and embracing the web inserted into said sub-cartridge, whereby said embraced web causes at least one of said convolute springs to expand as additional web is inserted therein, and means responsive to the insertion of a predetermined amount of said web for causing said convolute springs to complete an electrical circuit across said contacts.

5. The main cartridge of claim 2 wherein said blade comprises a flat spring member having an L-shape with one arm of the L attached to the housing and the other arm of the L cantilevered, split longitudinally, and sharpened as scissor blades.

6. A sub-cartridge for taking up a web from a supply reel in a main cartridge, said sub-cartridge comprising electrical contacts for completing an electrical connection between said electrical contacts in said sub-cartridge and corresponding electrical contacts in said main cartridge, a normally open plurality of nested convolute springs in said sub-cartridge for coiling and embracing a web inserted into said sub-cartridge, whereby said embraced web causes at least one of said convolute springs to expand as more web is inserted therein, and means responsive to the insertion of a predetermined amount of said web for causing said convolute springs to close and touch each other to complete an electrical circuit across said contacts in said sub-cartridge and said corresponding contacts in said main cartridge.

7. The sub-cartridge of claim 6 including means associated with said sub-cartridge for applying electrical contact pressure between said main and sub-cartridges.

8. A resuable cartridge for supplying web material sequentially past a station comprising a web supply reel encased in a removable light tight supply sub-cartridge; means in said cartridge for receiving said supply sub-cartridge; light tight removable take-up sub-cartridge means; first means in said cartridge for receiving said take-up sub-cartridge, said first means includes corresponding electrical contacts in each of said cartridge and said take-up sub-cartridge, and means for bringing said take-up sub-cartridge into contact with said cartridge with sufficient pressure to make good contact between said electrical contacts in said cartridge and said electrical contacts in said take-up sub-cartridge; said cartridge including guide means to direct said web along a path from said supply reel, past said station, and to said take-up sub-cartridge; means to drive said web from said supply reel to said take-up sub-cartridge.

9. The reusable cartridge of claim 8 wherein said cartridge includes means responsive to said web material to generate a signal when said supply reel is substantially spent.

10. The reusable cartridge of claim 8 wherein said take-up sub-cartridge includes means for creating a signal responsive to the insertion of a predetermined amount of said web in said take-up cartridge.

11. The reusable cartridge of claim 8 including cutting means in said path of said web material for cutting said web at any predetermined position.

* * * * *